(12) United States Patent
Oshinubi et al.

(10) Patent No.: US 11,525,702 B2
(45) Date of Patent: Dec. 13, 2022

(54) SENSOR SYSTEM FOR DETERMINING AT LEAST ONE ROTATION CHARACTERISTIC OF A ROTATING ELEMENT

(71) Applicant: Robert Bosch GmbH, Stuttgart (DE)

(72) Inventors: Dayo Oshinubi, Rutesheim (DE); Fabian Utermoehlen, Lippstadt (DE)

(73) Assignee: Robert Bosch GmbH, Stuttgart (DE)

( * ) Notice: Subject to any disclaimer, the term of this patent is extended or adjusted under 35 U.S.C. 154(b) by 57 days.

(21) Appl. No.: 16/626,632

(22) PCT Filed: May 7, 2018

(86) PCT No.: PCT/EP2018/061673
§ 371 (c)(1),
(2) Date: Dec. 26, 2019

(87) PCT Pub. No.: WO2019/001811
PCT Pub. Date: Jan. 3, 2019

(65) Prior Publication Data
US 2020/0116529 A1 Apr. 16, 2020

(30) Foreign Application Priority Data

Jun. 30, 2017 (DE) ...................... 10 2017 211 190.9

(51) Int. Cl.
*G01D 5/20* (2006.01)
*G01B 7/30* (2006.01)
(Continued)

(52) U.S. Cl.
CPC .............. *G01D 5/2053* (2013.01); *G01B 7/30* (2013.01); *G01D 5/2046* (2013.01); *G01P 3/487* (2013.01); *G01P 3/488* (2013.01)

(58) Field of Classification Search
CPC ...... G01D 5/2053; G01D 5/2046; G01B 7/30; G01P 3/487; G01P 3/488
See application file for complete search history.

(56) References Cited

U.S. PATENT DOCUMENTS 5,251,600 A * 10/1993 Britsch ................. F02P 7/0675
123/406.58
10,724,876 B2 * 7/2020 Herrmann ............ G01D 5/2053
(Continued)

FOREIGN PATENT DOCUMENTS

CN 102564297 A 7/2012
CN 105241373 A 1/2016
(Continued)

OTHER PUBLICATIONS

International Search Report dated Aug. 17, 2018 of the corresponding International Application PCT/EP2018/061673 filed May 7, 2018.

*Primary Examiner* — Reena Aurora
(74) *Attorney, Agent, or Firm* — Norton Rose Fulbright US LLP; Gerard Messina

(57) ABSTRACT

A sensor system for determining at least one rotation characteristic of an element rotating about at least one rotation axis includes at least one sensor wheel having a profile and being connectable to the rotating element; and at least one inductive position sensor including at least one coil arrangement that includes at least one excitation coil and at least two receiver coils, where at least in sections of the at least two receiver coils have a sinusoidal shape.

12 Claims, 3 Drawing Sheets

(51) Int. Cl.
*G01P 3/48* (2006.01)
*G01P 3/487* (2006.01)
*G01P 3/488* (2006.01)

(56) References Cited

U.S. PATENT DOCUMENTS

| | | |
|---|---|---|
| 2006/0001518 A1 | 1/2006 | Hayashi et al. |
| 2009/0261844 A1 | 10/2009 | Howard et al. |
| 2013/0057263 A1 | 3/2013 | Hosek |
| 2017/0227379 A1* | 8/2017 | Oshinubi ............. G01D 5/2046 |

FOREIGN PATENT DOCUMENTS

| | | |
|---|---|---|
| DE | 102004057205 A1 | 6/2005 |
| DE | 102012213539 | 2/2014 |
| EP | 0743508 A2 | 11/1996 |
| EP | 2851655 A1 | 3/2015 |
| JP | 2011157835 A | 8/2011 |
| WO | 0216864 A1 | 2/2002 |
| WO | 2016/079465 | 5/2016 |

\* cited by examiner

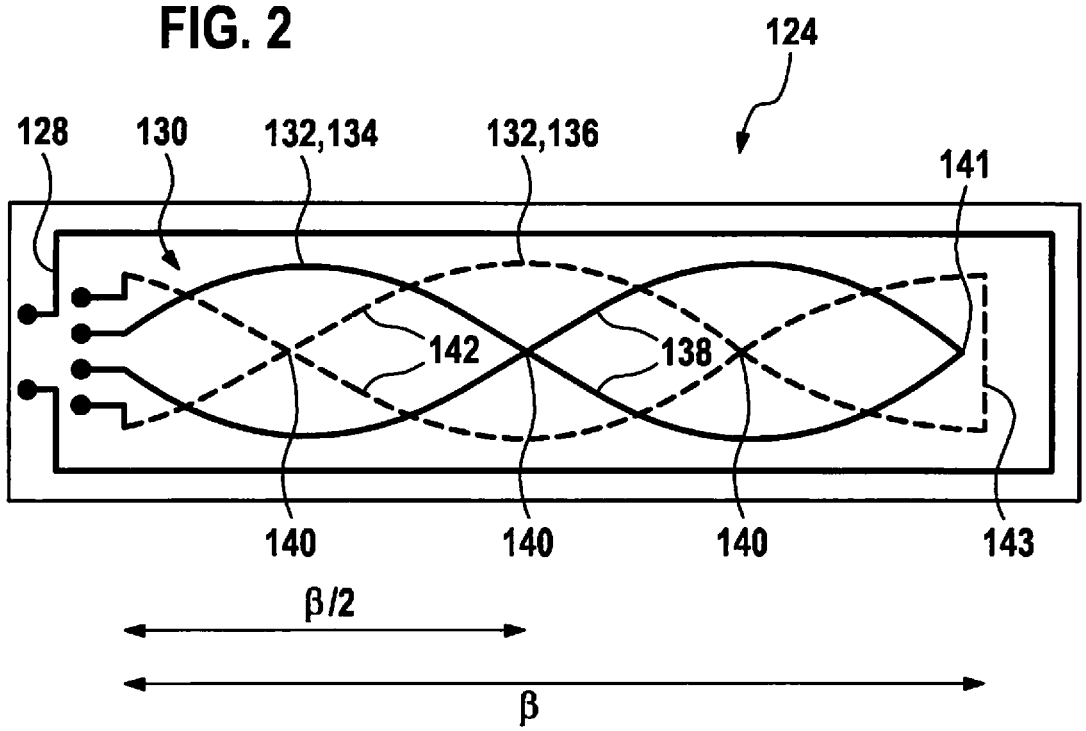
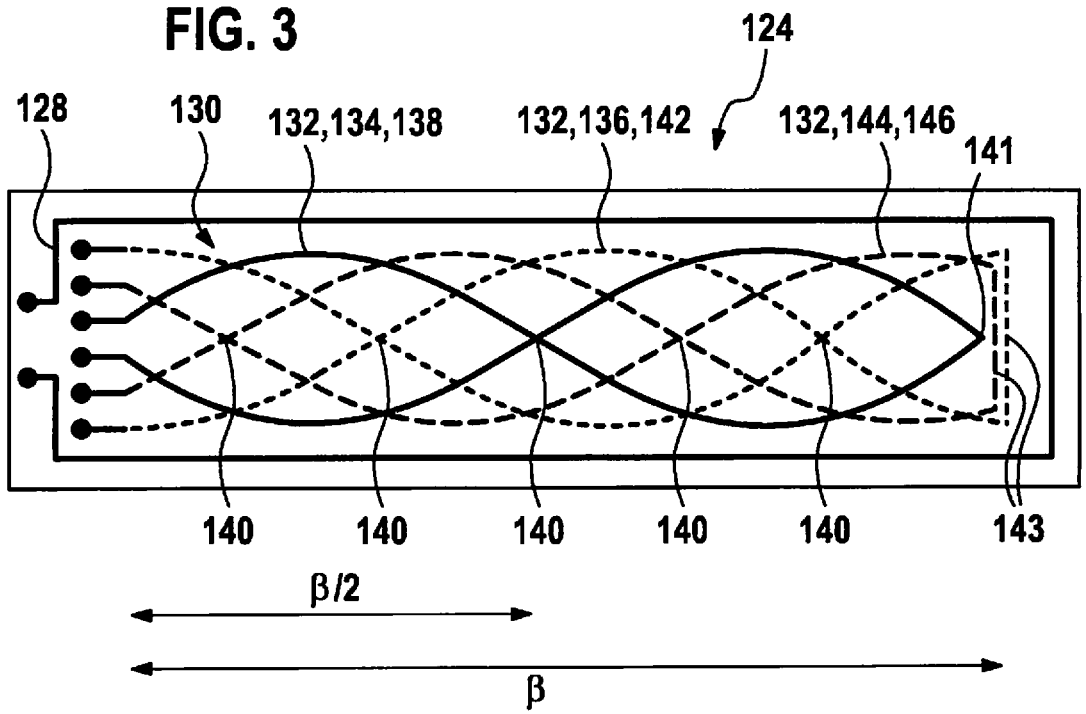

SENSOR SYSTEM FOR DETERMINING AT LEAST ONE ROTATION CHARACTERISTIC OF A ROTATING ELEMENT

CROSS-REFERENCE TO RELATED APPLICATIONS

The present application is the national stage of International Pat. App. No. PCT/EP2018/061673 filed May 7, 2018, and claims priority under 35 U.S.C. § 119 to DE 10 2017 211 190.9, filed in the Federal Republic of Germany on Jun. 30, 2017, the content of each of which are incorporated herein by reference in their entireties.

BACKGROUND

Numerous sensors are known from the related art that detect at least one rotation characteristic of rotating elements. Examples of such sensors are described in Konrad Reif (Ed.): Sensoren im Kraftfahrzeug [Sensors in the Motor Vehicle], $2^{nd}$ edition, 2012, pp. 63-74 and 120-129. For example, a position of a camshaft of an internal combustion engine relative to a crankshaft having a so-called phase sensor can be determined using a Hall sensor.

A sensor wheel is typically mounted on the rotating axle. Teeth can be situated on the sensor wheel that are scanned by the Hall sensor when the camshaft rotates. Thus, a method is described in DE 10 2012 213 539 A1 for determining a phase position of an adjustable camshaft of an internal combustion engine that includes a sensor wheel and a camshaft adjuster. The phase position of the camshaft is determined based on phase flank interrupts triggered by the sensor wheel and by a model that is dependent on at least one operating parameter of the camshaft adjuster.

A system for position detection is described in US 2013/0057263 that includes an incremental track having a plurality of sectors and an ancillary measuring system. The measuring system includes at least two separate reading heads, each of which includes at least one primary coil and at least two separate secondary coils. The secondary coils generate output signals, the amplitude of which is modulated by the sectors of the incremental track.

SUMMARY

Despite the improvements effectuated by such sensor devices, there is still a potential for improvement. One challenge in the case of many known methods continues to be the enablement of a continuous position detection or of an absolute position determination. An absolute position determination is often possible only in a dynamic case, when the sensor wheel rotates. However, an instantaneous ascertainment of an angular position when switching on the power supply, i.e., a true power-on function, would be desirable. A position is often not exactly known, in particular, during a start of a motor of the internal combustion engine. A rotation speed measurement is often possible only after the passing of at least two tooth flanks. Moreover, such methods exhibit in many cases a high sensitivity to magnetic interference fields. In the case of methods, in which an angular position is determined and in the case of corresponding sensor devices, however, a complex computing algorithm is required in many cases in order to determine the rotation characteristic, for example, the angular position, based on the detected signals.

Within the scope of the present invention, therefore, a sensor system is provided for determining at least one rotation characteristic of a rotating element. A "sensor system" is understood within the scope of the present invention to mean, in principle, an arbitrary device that is suitable for detecting at least one measured variable. Accordingly, a sensor system for determining at least one rotation characteristic is understood to mean a sensor system that is configured to detect, for example, to measure, the at least one rotation characteristic, and which is able, for example, to produce at least one electrical signal corresponding to the detected characteristic such as, for example, a voltage or a current. Combinations of characteristics can also be detectable. A "rotation characteristic" is understood within the scope of the present invention to mean, in principle, a characteristic that at least partially describes the rotation of the rotating element. This can be, for example, an angular velocity, a rotational speed, an angular acceleration, an angular position, or another characteristic that is able to at least partially characterize a continuous, discontinuous, uniform, or non-uniform rotation or revolution of the rotating element. The rotation characteristic can, for example, be a position, in particular, an angular position, a rotational speed, an angular acceleration, or a combination of at least two of these variables. Other characteristics and/or other combinations of characteristics can also be detectable. An "angular position" is understood within the scope of the present invention to mean, in principle, a rotation angle of a device capable of rotating, for example, of the rotating element or of the sensor wheel, with respect to an axis located perpendicularly on the rotation axis.

The sensor system can be configured, in particular, for use in a motor vehicle. A "rotating element" is understood within the scope of the present invention to mean, in particular, an arbitrary element that rotates about at least one axis. The rotating element can, for example, be a shaft, for example, a shaft in a drive machine, for example, a camshaft or a crankshaft. An angular position of a camshaft or a rotational speed of a camshaft or an angular acceleration of a camshaft or a combination of at least two of these variables can be determined, for example. Other characteristics and/or other combinations of characteristics can also be detectable.

The sensor system for determining at least one rotation characteristic of an element rotating about at least one rotation axis includes at least one sensor wheel connectable to the rotating element. The sensor wheel can, for example, be permanently or reversibly connected or connectable to the rotating element or can also be designed together with the rotating element as one piece or can be integrated into the rotating element.

The sensor wheel has a sensor wheel profile. The sensor wheel profile can include, in particular, at least one profile element. The sensor system further includes an inductive position sensor. The inductive position sensor includes at least one coil arrangement. The coil arrangement includes at least one excitation coil, also referred to as a transmitter coil, and at least two receiver coils, also referred to as receiving coils. The at least two receiver coils can, for example, form at least one receiver coil system. One or multiple receiver coil systems can be provided, for example, each of which is assigned one or multiple receiver coil(s). One or two or also more receiver coil system(s) can be provided, each of which is assigned two or more receiver coils.

The sensor system can, for example, be configured to apply at least one alternating voltage and/or at least one alternating current to the at least one excitation coil, for example, via at least one corresponding controller. The alternating voltage and/or the alternating current can, for example, have a frequency in the range of several MHz, for example, a frequency in the range of 1 MHz to 50 MHz, for example, 2 MHz to 20 MHz, in particular, 3 MHz to 10 MHz, for example, 5 MHz. In this way, an electromagnetic alternating field can form that couples into the receiver coils where, for example, it induces corresponding alternating voltages and/or alternating currents.

A "sensor wheel" can be understood within the scope of the present invention to mean an arbitrary component connectable to the rotating element that, when connected to the rotating element, is configured to trigger at least one measurable signal, in particular, a magnetic field change, per revolution of the rotating element. A "sensor wheel profile" can be understood within the scope of the present invention to mean, in principle, an entirety of profile elements and of gaps situated between the profile elements. A "profile element" of the sensor wheel can be understood within the scope of the present invention to mean an arbitrary implementation of the contour of the sensor wheel, in particular, a convexity, for example, a pin-shaped, a tooth-shaped, or a serrated convexity, or a notch or a recess, for example, a hole.

The sensor wheel can, for example, be designed to "shadow" areas of the receiving coil structure, depending on its position. In this way, a coupling between the transmitter coil structure and the receiving coils can be influenced as a function of the rotation angle. A typical value range of a coupling factor can, for example, be −0.3 to +0.3. Thus, a coupling factor in this case can be understood to mean, in particular, an amplitude ratio between a receive signal and a transmitter signal or excitation signal. The coupling factor can extend, in particular, sinusoidally with the rotation angle.

The sensor system, for example, of an evaluation circuit, can be configured, in particular, in order to deduce an absolute value and a phase of the coupling by demodulating a signal induced in the receiving coils with a carrier signal, i.e., with a signal of the transmitter coil. The absolute value can vary, in particular, continuously with the rotation angle. A phase position can be 0° or 180°, for example. A preferably offset-free sine/cosine-system can be formed by multiplying the absolute value with the cosine, in particular when using two receiving coils having a 90° phase shift relative to the measuring range. When using three receiving coils typically having a 120° phase shift relative to the measuring range, a, in particular, three-phase sinus signal can be formed that can be transferred into a sine/cosine system, for example, by applying the Clarke transformation. The rotation angle can then be deduced using the ArcTan function.

An "inductive position sensor" can be understood within the scope of the present invention to mean an arbitrary sensor that is able to produce a signal corresponding to a detected characteristic, in particular, a measuring signal, in particular, an electrical measuring signal, for example, a voltage or a current, a production of the measuring signal being based on a change of the magnetic flux. The detected characteristic can include, in particular, a position, for example, an angular position. The inductive position sensor can, in particular, be an inductive magnetic sensor. However, other designs are, in principle, also possible.

A "coil arrangement" can be understood within the scope of the present invention to mean an arbitrary device that includes at least one coil. A "coil" is understood within the scope of the present invention to mean an arbitrary component that exhibits an inductivity and is suitable for generating a magnetic field when current is flowing and/or vice versa. A coil can, for example, include at least a complete or partially closed conductor loop or winding. An "excitation coil" can be understood within the scope of the present invention to mean a coil that generates a magnetic flux when an electrical voltage and/or an electrical current is applied. The excitation coil can include at least one excitation winding. An "excitation coil" is understood within the scope of the present invention to mean a coil that is designed due to an inductive coupling between the excitation coil and the receiver coil to generate a signal that is a function of the inductive coupling. A "receiver coil system" can be understood within the scope of the present invention to mean an arbitrary device that includes at least two, preferably at least three, receiver coils.

The receiver coils have a sinusoidal shape, at least in sections. "Sinusoidal" is understood within the scope of the present invention to mean an arbitrary shape that has a profile of a sine curve. A profile of a complete sine curve, for example, or merely a part of a sine curve, can be included. "Sinusoidal, at least in sections" in this case can be understood to mean, in particular, that the receiver coil has at least one section that has a sinusoidal shape. In addition, one or multiple sections can also be included that have no sinusoidal profile, for example, straight sections. The receiver coils can, for example, include at least one complete sine curve. A "complete sine curve" in this case can be understood to mean, in particular, a profile of a sine curve that includes at least one period. In this case, the sine curve can begin at point zero or at an arbitrary other point of the sine curve. In general, slight deviations from the sinusoid are also possible in a sinusoidal profile. For example, deviations can be tolerated that in each point amount to not more than 20%, in particular, not more than 10% or even not more than 5% of the absolute value of the sinusoid. Thus, for example, the sinusoid can also be composed in sections of other functions, so that on the whole an approximate sinusoid results. For example, sections of the sinusoid can be composed of circular strip conductor sections. The sinusoid can thus be composed, for example, of circular arc sections, for example, of semicircles placed against one another and opened opposite one another.

At least one of the receiver coils can include, in particular, at least two partial windings. One partial winding in this case can have a shape that includes at least one complete sine curve, in particular, also exactly one sine curve. The successive partial windings of a receiver coil can directly succeed one another. Successive partial windings can, in particular, also be connected, for example, by a straight or non-curved section. Successive partial windings can have, in particular, the same period. Successive partial windings can have, in particular, the same amplitude, for example. Successive partial windings of a receiver coil can, in particular, be inversely oriented. Successive partial windings of a receiver coil can, in particular, be inversely oriented in such a way that the partial windings intersect at least at one point. The intersecting partial windings can, in particular, pass over one another so that the two intersecting partial windings do not touch at the point of intersection.

In addition to the receiver coils, signals can also be sinusoidal. The receiver coils can, in particular, be situated in such a way that the receiver coils generate sinusoidal signals when the rotating element rotates at a constant angular velocity about the rotation axis. In terms of the definition "sinusoidal," reference can also be made to the definition above with respect to the signals, in this case, for example, a spatial dimension being replaced by a time dimension.

The sensor system can include a number 'n' of receiver coils, n being a positive integer. The generated sinusoidal signals of the n receiver coils can be phase-shifted against one another. For example, adjacent sinusoidal signals can have a phase spacing of $2\pi/(2\pi)$ and/or $360°/(2\pi)$ for n=2. Adjacent sinusoidal signals can, for example, also have a phase spacing of $2\pi/(n)$ and/or $360°/(n)$ for n≥3. Adjacent sinusoidal signals of exactly two receiver coils can, in particular, have a phase spacing of 90°. Adjacent sinusoidal signals of exactly three receiver coils can, in particular, have a phase spacing of 120°.

The at least one coil arrangement can be situated on at least one circuit carrier. A multitude of coil arrangements can, in particular, also be situated on a shared circuit carrier. The circuit carrier can be situated essentially coaxially relative to the rotation axis. The circuit carrier can surround the sensor wheel or a circular segment of the sensor wheel essentially circularly or circularly segmented. The term "essentially circularly" is understood within the scope of the present invention to mean that the described component has a radius of curvature. The radius of curvature can vary within the component by a value from 0% to 80%, preferably from 0% to 50%, more preferably from 0% to 20% and particularly preferably from 0% to 5%. The radius of curvature can, in particular, also be constant. Alternatively or in addition, the circuit carrier can be composed of two or more segments, each of which can be designed flat or also curved, for example, and which can be connected to one another, for example. The segments can then also all be situated coaxially relative to the rotation axis, even if the individual segments are then situated tangentially, for example.

The coil arrangement, in particular, the coil arrangement situated on the circuit carrier, can surround the sensor wheel or at least a circular segment of the sensor wheel essentially circularly segmented or circularly. The coil arrangement, in particular, the coil arrangement situated on the circuit carrier can, in particular, cover at least one profile element and at least one gap between two profile elements of the sensor wheel in at least one angular position of the sensor wheel.

The circuit carrier can be flexibly designed. The circuit carrier can, in particular, include a flexible material. The circuit carrier can, in particular, be selected from the group made up of: a circuit board, in particular, a Starrflex circuit board, for example, a curved Starrflex circuit board; a rigid circuit board, in particular, a rigid circuit board with notches; a circuit card; and a board and a printed circuit, in particular a "printed circuit board" (PCB). The circuit carrier can, in particular, include at least two flat surfaces. The flat surfaces can be situated at an angle to one another. The circuit carrier can, in particular, include at least one connecting element, the connecting element connecting the flat surfaces to one another. The flat surfaces can, in particular, encompass an angle, the angle being able to have a value of 10° to 180°, preferably of 30° to 150° and particularly preferably of 60° to 120°. The circuit carrier can also be situated in a housing, in particular, in an injection molded housing.

The sensor system can be configured to detect an inductive coupling and/or a change of an inductive coupling between the excitation coil and the at least one receiver coil. The sensor system can be configured, in particular, to detect an inductive coupling caused by a movement and/or a position of the sensor wheel and/or by the change of the inductive coupling between the excitation coil and the receiver coils caused by a movement and/or a position of the sensor wheel. For this purpose, the sensor system can, for example, include a corresponding evaluation unit. The evaluation unit can, in particular, include at least one evaluation circuit. The evaluation circuit can, in particular, be configured to evaluate the signals of the position sensor. The evaluation circuit can, for example, be a processor. The evaluation unit can be situated together with the at least one coil arrangement on a shared circuit carrier. The evaluation unit can also be situated separately from the at least one coil arrangement.

The sensor system can be configured, in particular, to determine an absolute or relative angular position of the rotating element based on the change of the inductive coupling between the excitation coil and the receiver coils caused by the movement and/or by a position of the sensor wheel. A "relative angular position" in this case can be understood to mean, in principle, a position with respect to a period defined by the receiver coils.

The sensor system can be configured, in particular, to enable a detection of the absolute or relative angular position of the rotating element when switching on a power supply. The sensor system can enable, in particular, a detection of the angular position of the momentarily idle rotating element. This characteristic of the detection when switching on the power supply can also be referred to, in particular, as a "true-power-on" function. Thus, the sensory system can include, in particular, a "true-power-on" function.

The sensor system can include a single sensor wheel or also a multitude of sensor wheels. The sensor system can include, in particular, two sensor wheels. The at least two sensor wheels can, in particular, be situated offset to one another with respect to the rotation axis, i.e., for example, with an axial offset. The at least two sensor wheels can have identical or, in particular, also different sensor wheel profiles.

The sensor system can include at least two, preferably at least three receiver coils. In addition, each of the at least two receiver coils can cover at least one profile element and at least one gap between two elements of the sensor wheel in at least one angular position of the sensor wheel.

The at least two sinusoidal-shaped receiver coils of the sensor system can be situated phase-shifted relative to one another.

The at least two sinusoidal receiver coils can have, in particular, identical periods.

The periodicities of the sinusoidal receiver coils can, in particular, correspond to an integer multiple of an angular distance ß between two adjacent profile elements of the sensor wheel. An "integer multiple" in this case can be understood in general to mean a multiplication with a positive whole number 'm' that can also be one, for example.

Exactly two receiver coils can, in particular, also exhibit a phase shift relative to one another. The phase shift of exactly two receiver coils can, in particular, correspond to an integer multiple 'm' of the angular distance ß/4. The phase shift of a first receiver coil relative to a second receiver coil can, in particular, correspond exactly to an angular distance of ß/4.

Exactly three receiver coils can, in particular, also exhibit a phase shift relative to one another. The phase shift of exactly three receiver coils can, in particular, correspond to an integer multiple 'm' of the angular distance ß/3, for example, to the aforementioned integer multiple m. The phase shift of a first receiver coil relative to a second receiver coil, as well as the phase shift of a second receiver coil relative to a third receiver coil can, in particular, correspond in each case to exactly one angular distance of ß/3.

The sensor system can include a number of 'n' receiver coils. Adjacent receiver coils can, in particular, also exhibit a phase shift. The phase shift of n receiver coils of a sensor system can, in particular, correspond to an integer multiple m of the angular distance ß/(2π) for n=2 and/or ß/(n) for n≥3, for example, to the aforementioned integer multiple m.

The sensor system can include an evaluation circuit. The evaluation circuit can be configured, in particular, in such a way that an angular position Φ of the sensor wheel can be deduced from the signals of the receiver coils. The evaluation circuit can be configured, in particular, in such a way that it generates at least one quotient of at least two signals of at least two receiver coils. For example, the law tan Φ=sin Φ/cos Φ can be used for calculating the angular position Φ based on two signals generated by two receiver coils. For example, the Clarke transformation can be used for calculating the angular position Φ based on three signals generated by three receiver coils.

The coil arrangement of the sensor system can include a multitude of receiver coil systems. The coil arrangement can, in particular, include at least two receiver coil systems. The at least two receiver coil systems can, for example, be assigned a shared excitation coil. Alternatively or in addition, exactly one receiver coil system can also be assigned exactly one excitation coil.

The excitation coil can, in particular, enclose the receiver coil systems assigned to it. For example, an excitation coil can enclose exactly one receiver coil system assigned to it. For example, an excitation coil can also enclose at least two receiver coil systems assigned to it.

The receiver coil systems can be situated in parallel to one another in the circumferential direction and can be axially offset relative to one another with respect to the rotation axis. The receiver coils within a receiver coil system can each have the same periodicity. However, the periodicities of receiver coils of different receiver coil systems can, in particular, differ. Each of the receiver coil systems can be assigned a separate sensor wheel. A first receiver coil system can, in particular, be assigned a first sensor wheel. The first sensor wheel can, for example, have an angular distance $ß_1$ between two adjacent profile elements of the first sensor wheel. The first receiver coil system assigned the first sensor wheel can have a periodicity in this case. The periodicity of the first receiver coil system can, in particular, correspond to an integer multiple of $ß_1$. A second receiver coil system can, in particular, be assigned a second sensor wheel. The second sensor wheel can, for example, have an angular distance $ß_2$ between two adjacent profile elements of the second sensor wheel. The second receiver coil system assigned the second sensor wheel can have a periodicity in this case. The periodicity of the second receiver coil system can, in particular, correspond to an integer multiple of $β_2$. The angular distance $ß_2$ between adjacent profile elements of the second sensor wheel can differ from the angular distance $ß_1$ between two adjacent profile elements of the first sensor wheel.

The sensor system can be configured to offset the signals of the receiver coil systems against one another according to the Nonius principle, each of which can be assigned a separate sensor wheel. The offsetting of the signals of the receiver coil systems according to the Nonius principle can in this case enable a conclusion to be drawn about an absolute angular position of the rotating element. For example, a first single angle calculated from the signals of the first receiver coil systems can have a size 2π/k, with a natural number k. For example, a second single angle calculated from the signals of the second receiver coil system can have a size 2π/j with a natural number j≠k. For example, an absolute angular position in the range of up to 2π can be deduced from the first single angle and from the second single angle. It can, in particular, be possible that an angle in the range of up to 360° can be deduced from two single angles, each of which are a maximum of 360°/k (with a natural number k) and 360°/j (with a natural number j, where j≠k) in size.

In another aspect of the present invention, a method is provided for determining at least one rotation characteristic of an element rotating about at least one rotation axis. The method includes the use of at least one sensor system. The method includes the following steps, preferably in the order indicated. In addition to the cited method steps, the method can also include additional method steps.

The method steps are: receiving at least two inductive signals using at least two receiver coils; and evaluating the inductive signals and ascertainment of the rotation characteristic using the inductive signals.

The method takes place using a sensor system according to the present invention, i.e., according to one of the aforementioned example embodiments or according to one of the example embodiments described in greater detail below. Accordingly, reference can largely be made to the description of the sensor element for definitions and for optional designs. However, other designs are, in principle, also possible.

The inductive signals of the inductive position sensor can include, in particular, at least one signal selected from the group made up of the inductive coupling in the coil arrangement and of the change of the inductive coupling in the first coil arrangement. The inductive signals can, in particular, be voltage signals, in particular, voltages generated in the receiver coils. The voltages can, in particular, be generated in the receiver coils due to the inductive coupling of the receiver coils with the at least one excitation coil. The inductive coupling and/or the change of the inductive coupling in the coil arrangement can, in particular, be a function of a movement and/or of a position of the sensor wheel. The method can further include a determination of the angular position of the rotating element using the detected inductive coupling and/or change of the inductive coupling in the first coil arrangement as a function of the position and/or movement of the sensor wheel.

The method can further include the processing of the inductive signals by an evaluation circuit. The method can further include the forwarding of the inductive signals to a control unit, for example, to a processor. The method can further include an ascertainment of the rotation characteristic, for example, of the angular position, using an evaluation of the inductive signals.

The provided device and the provided method have numerous advantages over known devices and methods. It is possible, in particular, that the sinusoidal signals generated according to the present invention using the receiver coils reduce the complexity of ascertaining at least one rotation characteristic, in particular, the angular position Φ, as compared to the related art. It can be possible, in particular, that the calculation, in particular, the back transformation, can be simplified as compared to the related art by using a calculation rule, for example, the Clarke transformation and/or for example, the law tan Φ=sin Φ/cos Φ.

The generation according to the present invention of the sinusoidal signals using the sinusoidal-shaped receiver coils can, in particular, reduce the complexity of the measuring principle as compared to the related art. It is possible, in particular, that the sensor system according to the present invention includes a simple measuring principle.

In addition, the sensor system can exhibit a very high sensitivity as compared to the related art. Using the sensor system according to the present invention, it is possible to enhance the reliability of the ascertained values of the at least one rotation characteristic, in particular, of the angular position Φ, as compared to the related art. In addition, the values of the at least one rotation characteristic, in particular, of the angular position Φ, ascertained using the sensor system according to the present invention, can be subject to no influence or very little influence by magnetic interference fields. An influence of magnetic fields on the sensor system according to the present invention due to high currents through electrically conductive materials, in particular, cables, situated close to the sensors can, in particular, be reduced.

The sensor system according to the present invention can provide a significant advantage in installation and removal, in particular, as compared to the related art, in particular, in the utilization of the sensor system according to the present invention for camshaft position detection. Thus, it is possible, in particular, that deviations in the shaping, in particular, manufacturing-related deviations of the geometrical shape, in particular, mechanical tolerances of the components surrounding the sensor system, have no influence on the functionality of the sensor system. Greater mechanical tolerances, in particular, can be permitted as compared to the tolerances usually permitted in the related art, in particular, in the installation of the sensor system. The sensor system according to the present invention could, in particular, be robust regarding tolerances as compared to the related art.

In addition, the provided sensor system can have significantly smaller required installation space as compared to the related art. Moreover, the sinusoidal shaping of the receiver coils generally results in no additional costs. Thus, the sensor system according to the present invention can, in particular, be cost-efficiently designed.

In addition, a measuring range of the sensor system according to the present invention can be expanded to 360° by an evaluation using two or multiple sensor wheels and/or different sensor wheel profiles, in particular, a different number of teeth to include a detection of the angular position, in particular, an absolute angle detection, of a sensor wheel and/or of a rotating element, in particular, of a wave position. A precise measurement can take place, for example, using the Nonius principle or of the Vernier method. The coil arrangement, in particular, the coil arrangement situated on the circuit carrier, can, in particular, cover at least one profile element and at least one gap between two profile elements of the sensor wheel in at least one angular position of the sensor wheel. An opening angle α of the coil arrangement can, in particular, correspond at least to an opening angle ß of the circular segment of the sensor wheel covered by the coil arrangement, encompassing at least one profile element and at least one gap between two profile elements.

In addition, the provided sensor system can enable an availability of the angular position of the rotating element when switching on a power supply. The sensor system according to the present invention can, in particular, have a true-power-on function. A true-power-on function is increasingly demanded by many original equipment manufacturers (OEM).

In addition, the provided device can permit the application of a multitude of methods for determining at least one rotation characteristic such as, for example, the rotational speed or the angular velocity. It can prove advantageous to employ a multitude of such methods, for example, to check a value obtained with a method.

Additional optional details and features of the present invention result from the following description of example embodiments that are schematically depicted in the figures.

BRIEF DESCRIPTION OF THE DRAWINGS

FIGS. 2-4 schematically show representations of an inductive position sensor for use in the sensor system according to example embodiments of the present invention.

DETAILED DESCRIPTION

Figure 1:
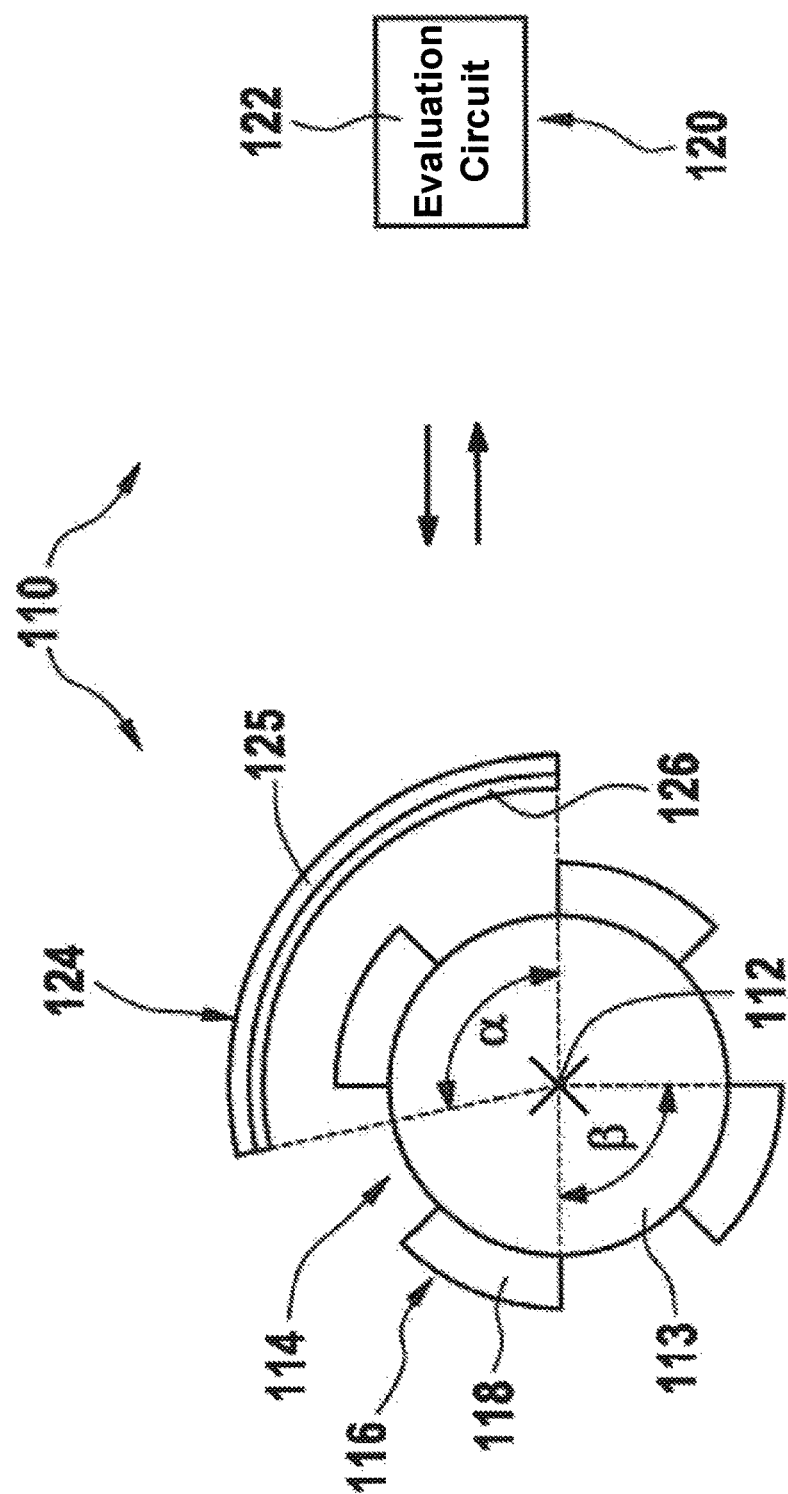
FIG. 1 schematically shows a top view of a representation of a sensor system according to an example embodiment of the present invention.

FIG. 1 shows an example embodiment of a sensor system 110 for determining at least one rotation characteristic of an element 113 rotating about at least one rotation axis 112. Sensor system 110 can be configured, in particular, for use in the motor vehicle. Sensor system 110 can be configured, in particular, to detect at least one rotation characteristic of a camshaft. Sensor system 110 can, for example, be configured to detect an angular position of the camshaft. Accordingly, rotating element 113 can be a camshaft, for example.

In addition to the elements depicted in FIG. 1, sensor system 110 can also include one or multiple additional elements, for example, one or multiple additional functional elements not depicted in the figures such as, for example, electrodes, electrode leads, contacts, multiple layers, heating elements, or other elements as shown, for example, in the aforementioned related art.

Sensor system 110 includes at least one sensor wheel 114 connectable to a rotating element 113. Sensor wheel 114 has a sensor wheel profile 116, including at least one profile element 118. The at least one profile element 118 can, in particular, be selected from the group made up of: a convexity, in particular, a pin-shaped, tooth-shaped, or serrated convexity, for example, a tooth, as depicted in FIG. 1; a notch; a recess for example, a hole, a track profiled in the width of sensor wheel 114. Sensor wheel 114 can, in particular, include a plurality of profile elements 118, as is apparent in FIG. 1. The plurality of profile elements 118 can, in particular, be distributed over the circumference of sensor wheel 114. Profile elements 118 can, in particular, be equidistantly and/or periodically situated. Other designs of sensor wheel 116 are also possible. Sensor wheel 114 can, in particular, include at least one material selected from the group made up of: an electrically conductive material; a ferromagnetic material; and a metal. Profile element 118 can, in particular, include at least one material selected from the group made up of: an electrically conductive material; a ferromagnetic material; and a metal. Sensor system 110 can include, in particular, at least two sensor wheels 114. Sensor wheels 114 can, in particular, have different sensor wheel profiles 116.

Rotating element 113 rotates about the at least one rotation axis 112. The at least one sensor wheel 114 is connectable to the rotating element, in particular, connected as shown in FIG. 1. Sensor wheel 114 can also have a rotation axis, rotating element 113 and sensor wheel 114, in particular, being able to rotate together about rotation axis 112, as depicted in FIG. 1.

Sensor system 110 can also include an evaluation unit 120 that includes at least one evaluation circuit 112. As depicted in FIG. 1, evaluation unit 120 can be situated in a separate housing, in particular, in an injection molded housing. However, another design is, in principle, also possible, for example, a design in which evaluation unit 120 is combined with other components of sensor system 110, for example, with at least one inductive position sensor explained in even greater detail below.

Sensor system 110 further includes at least one inductive position sensor 124. Inductive position sensor 124 includes at least one circuit carrier 125 and at least one coil arrangement 126 that is connected to circuit carrier 125, for example, is mounted on the circuit carrier, in particular, on a side of circuit carrier 125 facing rotating element 113.

Evaluation unit 120 can, for example, also be entirely or partially integrated into circuit carrier 125 and/or also mounted on circuit carrier 125, as explained above. For example, evaluation unit 120 can be entirely or partially situated with the at least one coil arrangement 126 on a shared circuit carrier 125. Evaluation unit 120 can also be situated entirely or partially separately from the at least one coil arrangement 126, for example, on at least one additional circuit carrier and/or in a housing.

Circuit carrier 125 can be rigidly or flexibly designed. Circuit carrier 125 can, in particular, have a bendable and/or curved design, for example, circular or curved in a circular segmented manner, as is depicted in FIG. 1. Circuit carrier 125 can, in particular, include a flexible material. Circuit carrier 125 can, in particular, be selected from the group made up of: a circuit board, in particular a flexible circuit board, in particular, a Starrflex circuit board, for example, a curved Starrflex circuit board; a rigid circuit board, in particular, a rigid circuit board with notches; a circuit card; and a board and a printed circuit, in particular a "printed circuit board" (PCB).

Figure 4:
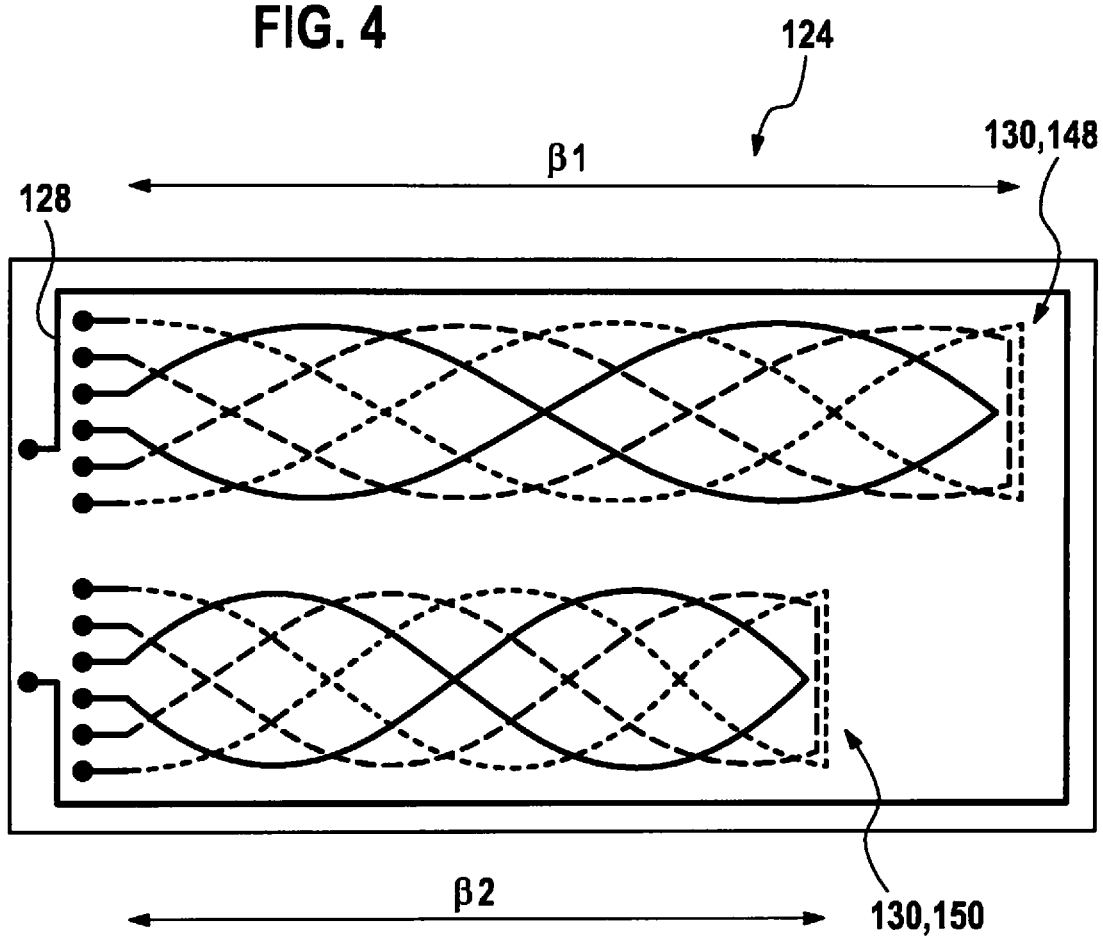

Coil arrangement 126 includes at least one excitation coil 128 and at least one receiver coil system 130 that are not depicted in FIG. 1 and which are apparent in detail in the example embodiments of FIGS. 2-4. Receiver coil system 130 includes at least two receiver coils 132. FIG. 2 shows an example embodiment having exactly two receiver coils 132. Examples in which receiver coil system 130 includes three receiver coils 132 are shown as alternative designs in FIGS. 3 and 4. Alternatively, more than three receiver coils 132 can also be provided. As is apparent in all example embodiments, receiver coils 132 are sinusoidal, at least in sections.

Coil arrangement 126 can, in particular, as is apparent in FIG. 1, have an opening angle $\alpha$, i.e., can cover or sensorily detect an angular range $\alpha$ about rotation axis 112. The periodicities of sinusoidal receiver coil systems 130 in this case can correspond to an angular distance B between two adjacent profile elements 118 of sensor wheel 114, as is apparent in the example embodiments depicted in FIGS. 2 and 3. Opening angle $\alpha$ can, in particular, be as large as angular distance B, i.e., $\alpha \geq \beta$. The periodicities of sinusoidal receiver coil systems 130 can, in particular, also correspond to an integer multiple of angular distance B between two adjacent profile elements 118 of sensor wheel 114.

FIG. 2 depicts an example embodiment of inductive position sensor 124, in which receiver coil system 130 includes exactly two receiver coils 132, namely one first receiver coil 134 and one second receiver coil 136. First receiver coil 134 includes two first partial windings 138 directly succeeding each other in the example embodiment depicted in FIG. 2. In this case, the two first partial windings 138 have the same period as well as, for example, the same amplitude. The two first partial windings 138 of first receiver coil 134 can be oriented in opposite directions, as is apparent in FIG. 2, i.e., for example, shifted relative to each other by half a period. The two first partial windings 138 of first receiver coil 134 can be oriented in opposite directions in such a way that the two first partial windings 138 intersect at at least one point of intersection 140. At the right end of the arrangement according to FIG. 2, first partial windings 138 can, for example, be connected in a node 141, similar to a reflected wave. In the example embodiment depicted in FIG. 2, the two first partial windings 138 of first receiver coil 134 have by way of example exactly one point of intersection 140 that is located at half the angular distance B, i.e., at ß/2.

Second receiver coil 136 in the example embodiment depicted in FIG. 2 includes two second partial windings 142 directly succeeding each other that are connected by a straight section 143, similar to an antinode of a reflected wave. In this case, the two second partial windings 142 have the same period as well as, for example, the same amplitude. The two second partial windings 142 of second receiver coil 136 can be oriented in opposite directions, as is apparent in FIG. 2, i.e., again shifted by a half period relative to each other. The two second partial windings 142 of second receiver coil 136 can, in particular, be oriented in opposite directions in such a way that the two second partial windings 142 intersect at at least one point of intersection 140. In the example embodiment depicted in FIG. 2, the two second partial windings 142 of second receiver coil 136 have exactly two points of intersection 140. The two points of intersection 140 of the two second partial windings 142 of second receiver coil 136 are located in the example embodiment depicted at a distance of ß/4 to point of intersection 140 of the two first partial windings 138 of first receiver coil 134. The distances of point of intersection 140 of first receiver coil 134 to points of intersection 140 of second receiver coil 136 can result from the phase shift of first receiver coil 134 relative to second receiver coil 136.

In the embodiment according to FIG. 2, receiver coils 132 can be shaped, in particular, in such a way that sinusoidal signals result. This can be achieved, as shown in FIG. 2, in that these sinusoidal signals are composed of sinusoidal partial windings 138, 142. In this case, an exact sinusoid can be implemented or also a deviation from a sinusoid, for example, using circular sections, for example, oppositely oriented semi-circles or circular segments set against one another. Thus, for example, a two-phase system can be implemented with the arrangement according to FIG. 2. Each of receiver coils 132 can, in particular, each enclose a clockwise extending and counterclockwise extending coil surface of identical size. The area of first receiver coil 134 identified with ß/2, for example, represents by definition a partial winding extending clockwise, whereas the remaining part of first receiver coil 134 extends counterclockwise. At point of intersection 140 that is situated preferably exactly in the middle of the measuring range, the conductor tracks pass over each other and do not touch.

If the depicted structure is then passed over by a sensor wheel 114 according to FIG. 1, first receiver coil 134 delivers a sinusoidal signal, and second receiver coil 136 delivers a co-sinusoidal signal. Based on the law $$\tan \Phi = \sin \Phi / \cos \Phi \qquad (1),$$

rotation angle $\Phi$ can be recalculated by division and subsequent arctan calculation. The two receiver coils 134, 136 should be shifted toward each other at angle ß/4 for this purpose in order to ensure an electrical phase shift of 90°. In practice, possible offsets of the two coil signals can be compensated for, for example, via a corresponding calibration.

FIG. 3 depicts another example embodiment of an inductive position sensor 124, in which receiver coil system 130 includes exactly three receiver coils 132, namely a first receiver coil 134, a second receiver coil 136, and a third receiver coil 144. First receiver coil 134 includes two first partial windings 138 directly succeeding each other. In this case, the two first partial windings 138 have the same period as well as, for example, the same amplitude. The two first partial windings 138 of first receiver coil 134 can be oriented in opposite directions as is apparent in FIG. 3. The two first partial windings 138 of first receiver coil 134 can, in particular, be oriented in opposite directions in such a way that the two first partial windings 138 intersect at at least one point of intersection 140. In the example embodiment depicted in FIG. 3, the two first partial windings 138 of first receiver coil 134 have exactly one point of intersection 140 that is located preferably at half the angular distance ß, i.e., at ß/2. The two first partial windings 138 are connected to each other in a node 141 at the right end of the arrangement depicted in FIG. 3.

In the example embodiment depicted in FIG. 3, second receiver coil 136 includes two successive second partial windings 142 that are connected to each other by a straight section 143. In this case, the two second partial windings 142 have the same period as well as, for example, the same amplitude. The two second partial windings 142 of second receiver coil 136 can, as is apparent in FIG. 3, be oriented in opposite directions. The two second partial windings 142 of second receiver coil 136 can, in particular, be oriented in opposite directions in such a way that the two second partial windings 142 intersect at at least one point of intersection 140. In the example embodiment depicted in FIG. 3, the two second partial windings 142 of second receiver coil 136 have exactly two points of intersection 140.

In the example embodiment depicted in FIG. 3, third receiver coil 144 includes two consecutive third partial windings 146 that are connected by a straight section 143. In this case, the two third partial windings 146 have the same period as well as, for example, the same amplitude. The two third partial windings 146 of third receiver coil 144 can be oriented in opposite directions, as is apparent in FIG. 3. The two third partial windings 146 of third receiver coil 144 can, in particular, be oriented in opposite directions in such a way that the two third partial windings 146 intersect at at least one point of intersection 140. In the example embodiment depicted in FIG. 3, the two third partial windings 146 of third receiver coil 144 have exactly two points of intersection 140.

The distances of point of intersection 140 of first receiver coil 134 to points of intersection 140 of second receiver coil 136, as well as the distances of point of intersection 140 of first receiver coil 134 to points of intersection 140 of third receiver coil 144, as well as the distances of points of intersection 140 of second receiver coil 136 to points of intersection 140 of third receiver coil 144 can result from the phase shift of first receiver coil 134 relative to second receiver coil 136, as well as from the phase shift of first receiver coil 134 relative to third receiver coil 144, as well as from the phase shift of second receiver coil 136 relative to third receiver coil 144.

A more robust measurement is possible with the embodiment according to FIG. 3 as compared to the embodiment according to FIG. 2, and a three-phase system can be implemented. Here, for example, the three receiver coils 134, 136, 144 are each shifted by ß/3 relative to one another, the result of which is a three-phase system with a 120° electrical phase shift. Based on this system, an offset-free sine/cosine system can be generated, for example, after implementation of a Clarke transformation that can then be transferred into the rotational angle using an arctan calculation. The coil structures are preferably designed in such a way that each fills out the complete area 13.

FIG. 4 depicts another example embodiment of an inductive position sensor 124 that includes two receiver coil systems 130, each including exactly three receiver coils 132. A design having a multitude of receiver coil systems 130 is also possible. The at least two receiver coil systems 130 can, in particular, include the same number of receiver coils 132, in particular, however, also a different number of receiver coils 132.

The at least two receiver coil systems 130 can be situated offset relative to one another in the circumferential direction of the at least one sensor wheel 114 in parallel to one another and axially with respect to rotation axis 112 of the at least one sensor wheel 114.

The two receiver coil systems 130 depicted in FIG. 4 can each resemble in their structure receiver coil system 130 with exactly three receiver coils 132 depicted in FIG. 3, apart from the respective period. Receiver coils 132 of receiver coil systems 130 depicted in FIG. 4 can each have the same periodicity within one receiver coil system 130. However, the periodicities of receiver coils 132 of first receiver coil system 148 can, in particular, differ from the periodicities of receiver coils 132 of second receiver coil system 150. Each of receiver coil systems 130 can be assigned a separate sensor wheel 114. First receiver coil system 148 can, in particular, be assigned a first sensor wheel that is not depicted in the figures and can be designed, for example, similar to FIG. 1. The first sensor wheel can, for example, have an angular distance $ß_1$ between two adjacent profile elements of the first sensor wheel. First receiver coil system 148 assigned the first sensor wheel in this case can have one periodicity. As depicted in FIG. 4, the periodicity of first receiver coil system 148, in particular, can correspond to an integer multiple of $ß_1$.

A second receiver coil system 150 can, in particular, be assigned a second sensor wheel that is also not depicted in the figures, and which can be designed similarly to FIG. 1. The second sensor wheel can, for example, be shifted axially relative to the first sensor wheel, for example, perpendicularly to the drawing plane in FIG. 1. The second sensor wheel can, for example, have an angular distance $ß_2$ between two adjacent profile elements of the second sensor wheel that preferably differs from angular distance $ß_1$. In this case, second receiver coil system 150 assigned the second sensor wheel can have one periodicity. As depicted in FIG. 4, the periodicity of second receiver coil system 150 can, in particular, correspond to an integer multiple of $ß_2$. The angular distance $ß_2$ between two adjacent profile elements of the second sensor wheel can differ from angular distance $ß_1$ between two adjacent profile elements of the first sensor wheel.

Coil arrangement 126 can include at least two receiver coil systems 130. For example, the at least two receiver coil systems 130 can be assigned a shared excitation coil 128, as is apparent in the example embodiment depicted in FIG. 4. Alternatively or in addition, exactly one receiver coil system 130 can also be assigned exactly one excitation coil 128, as is depicted in the example embodiments depicted in FIGS. 2 and 3. Excitation coil 128 can, in particular, enclose the at least one receiver coil system 130 assigned to it. An excitation coil 128 can, for example, enclose exactly one receiver coil system 130 assigned to it, as is depicted in FIGS. 2 and 3. An excitation coil 128 can, for example, also enclose at least two receiver coil systems 130 together assigned to it, as is apparent in FIG. 4.

The arrangement shown in FIG. 4 can be used in order to implement an absolute angular measurement with a 360° measuring range. For this purpose, the two receiver coil systems 148, 150 are used, each of which is able to interact with a separate sensor wheel 114, as explained above. These receiver coil systems should each have a different measuring range $\beta_1$, $\beta_2$, as shown in FIG. 4. An excitation, as is also apparent in FIG. 4, can take place via a shared circumferential excitation coil 128. Alternatively, separate excitation coils 128 could also be provided. Based on the individual angles of the two receiver coil systems 148, 150, it is then possible, for example, via a Nonius principle with a 360° uniqueness range, to recalculate to rotation angle Φ.

What is claimed is:

1. A sensor system, for a motor vehicle, for determining at least one rotation characteristic of an element rotating about at least one rotation axis, comprising:
    a first sensor wheel that is connectable to the rotating element and that includes a sensor wheel profile having a plurality of profile elements;
    an inductive position sensor that includes a coil arrangement having an excitation coil, and a receiver coil system having at least two receiver coils that have at least a partly sinusoidal shape, wherein the inductive position sensor includes at least one circuit carrier, the coil arrangement being connected to or mounted on the circuit carrier; and
    an evaluation unit having at least one evaluation circuit;
    wherein each of the profile elements is selected from the group made up of: a convexity, a pin-shaped convexity, a tooth-shaped convexity, a serrated convexity, a notch, a recess, a hole, and/or a track profiled in a width of the sensor wheel,
    wherein the plurality of profile elements are distributed over a circumference of the sensor wheel, and wherein the profile elements are equidistantly and/or periodically situated,
    wherein the sensor wheel includes at least one material selected from the group made up of: an electrically conductive material; a ferromagnetic material; and a metal,
    wherein each of the profile elements includes at least one material selected from the group made up of: an electrically conductive material; a ferromagnetic material; and a metal,
    wherein the rotating element rotates about the at least one rotation axis, the sensor wheel having a rotation axis, and wherein rotating element and sensor wheel are rotatable together about the rotation axis, and
    wherein the coil arrangement has an opening angle that covers or sensorily detects an angular range about the rotation axis, wherein periodicities of the sinusoidal receiver coil systems correspond to an angular distance between two adjacent ones of the profile elements of the sensor wheel, wherein the opening angle can be as large as the angular distance, wherein the periodicities of the sinusoidal receiver coil systems correspond to an integer multiple of the angular distance between two adjacent ones of the profile elements of the sensor wheel.

2. The sensor system of claim 1, wherein the at least two receiver coils are situated so that the at least two receiver coils generate, during a rotation of the rotating element at a constant angular velocity about the rotation axis, sinusoidal signals that are phase-shifted relative to one another so that adjacent ones of the sinusoidal signals have a phase spacing of 360°/2n for n=2 and 360°/n for n≥3, and wherein n is a total number of the at least two receiver coils included in the coil arrangement.

3. The sensor system of claim 1, wherein, in at least one angular position of the coil arrangement, the coil arrangement covers at least one of a plurality of profile elements of the sensor wheel and at least one gap between two of the plurality of profile elements.

4. The sensor system of claim 1, wherein the at least two receiver coils are each made up of at least two partial windings, and, for at least two immediately adjacent ones of the at least two received coils, the respective partial windings are oriented in opposite directions of each other.

5. The sensor system of claim 1, further comprising:
    a second sensor wheel having a different sensor wheel profile than the first sensor wheel.

6. The sensor system of claim 1, wherein, in at least one angular position of the receiver coils, each of the receiver coils covers at least one of a plurality of profile elements of the sensor wheel and at least one gap between two of the plurality of profile elements.

7. The sensor system of claim 1, wherein at least two of the receiver coils are phase shifted relative to one another and have identical periods.

8. The sensor system of claim 1, wherein a periodicity of the sinusoidal receiver coils corresponds to an integer multiple of an angular distance between two adjacent ones of a plurality of profile elements of the sensor wheel.

9. The sensor system of claim 1, further comprising:
    wherein the evaluation circuit is configured to deduce an angular position of the sensor wheel based on signals of the receiver coils.

10. The sensor system of claim 1, wherein the coil arrangement includes at least two receiver coil systems, each of the at least two receiver coil systems including at least two of the receiver coils.

11. The sensor system of claim 10, further comprising:
    at least one further sensor wheel, and wherein each of the receiver coil systems is assigned a respective one of the first sensor wheel and the at least one further sensor wheel.

12. A method for determining at least one rotation characteristic of an element rotating about at least one rotation axis using a sensor system for a motor vehicle, the method comprising:
    receiving at least two inductive signals via the receiver coils, wherein the sensor system includes: (a) a first sensor wheel that is connectable to the rotating element and that includes a sensor wheel profile having a plurality of profile elements, and (b) an inductive position sensor that includes a coil arrangement, wherein the coil arrangement includes an excitation coil and a receiver coil system having at least two receiver coils, which, at least in part, have a sinusoidal shape; and
    ascertaining, via an evaluation unit having at least one evaluation circuit, the rotation characteristic based on the received inductive signals;
    wherein the inductive position sensor includes at least one circuit carrier and the coil arrangement, the coil arrangement being connected to or mounted on the circuit carrier,
    wherein each of the profile elements is selected from the group made up of: a convexity, a pin-shaped convexity, a tooth-shaped convexity, a serrated convexity, a notch, a recess, a hole, and/or a track profiled in a width of the sensor wheel, wherein the plurality of profile elements are distributed over a circumference of the sensor wheel, and wherein the profile elements are equidistantly and/or periodically situated, wherein the sensor wheel includes at least one material selected from the group made up of: an electrically conductive material; a ferromagnetic material; and a metal, wherein each of the profile elements includes at least one material selected from the group made up of: an electrically conductive material; a ferromagnetic material; and a metal, wherein the rotating element rotates about the at least one rotation axis, the sensor wheel having a rotation axis, and wherein rotating element and sensor wheel are rotatable together about the rotation axis, and wherein the coil arrangement has an opening angle that covers or sensorily detects an angular range about the rotation axis, wherein periodicities of the sinusoidal receiver coil systems correspond to an angular distance between two adjacent ones of the profile elements of the sensor wheel, wherein the opening angle can be as large as the angular distance, wherein the periodicities of the sinusoidal receiver coil systems correspond to an integer multiple of the angular distance between two adjacent ones of the profile elements of the sensor wheel.

* * * * *